US010978951B2

(12) United States Patent
Hikihara et al.

(10) Patent No.: US 10,978,951 B2
(45) Date of Patent: Apr. 13, 2021

(54) PASSIVITY-BASED SWITCHING POWER SUPPLY SYSTEM, CONTROLLER, AND CONTROL METHOD

(71) Applicant: Kyoto University, Kyoto (JP)

(72) Inventors: Takashi Hikihara, Kyoto (JP); Yuhei Sadanda, Kyoto (JP)

(73) Assignee: Kyoto University, Kyoto (JP)

( * ) Notice: Subject to any disclaimer, the term of this patent is extended or adjusted under 35 U.S.C. 154(b) by 0 days.

(21) Appl. No.: 16/500,855

(22) PCT Filed: Apr. 6, 2018

(86) PCT No.: PCT/JP2018/014659
§ 371 (c)(1),
(2) Date: Oct. 4, 2019

(87) PCT Pub. No.: WO2018/190249
PCT Pub. Date: Oct. 18, 2018

(65) Prior Publication Data
US 2020/0106362 A1    Apr. 2, 2020

(30) Foreign Application Priority Data
Apr. 12, 2017    (JP) .............................. JP2017-078861

(51) Int. Cl.
*H02M 3/158*    (2006.01)
*H02M 3/157*    (2006.01)
*H02M 1/00*    (2006.01)

(52) U.S. Cl.
CPC .......... *H02M 3/1584* (2013.01); *H02M 3/157* (2013.01); *H02M 2001/0009* (2013.01)

(58) Field of Classification Search
CPC ....... H02M 3/1584; H02M 2001/0009; H02M 2300/40
See application file for complete search history.

(56) References Cited

U.S. PATENT DOCUMENTS 4,638,873 A * 1/1987 Welborn ............. E21B 17/1014
175/325.2
5,057,992 A * 10/1991 Traiger ................ G05B 13/023
700/52
(Continued)

FOREIGN PATENT DOCUMENTS

EP    2 595 291 A1    5/2013

OTHER PUBLICATIONS

Hikihara, Takashi et al., "Regulation of Parallel Converters with Respect to Stored Energy and Passivity Characteristics," IEICE Transactions on Fandamentals of Electronics, Communications and Computer Sciences, 94 (3), 2011, pp. 1010-1014.
(Continued)

*Primary Examiner* — Yusef A Ahmed
(74) *Attorney, Agent, or Firm* — Faegre Drinker Riddle & Reath LLP

(57) ABSTRACT

In a case where passivity-based control is applied to a plurality of circuits connected in parallel, a simpler target state is used. A switching power supply system includes: a plurality of switching power supply circuits connected in parallel to a load R; and a controller configured to switch each of the plurality of switching power supply circuits, through passivity-based control, by using a sum of currents that flow in the plurality of switching power supply circuits.

10 Claims, 12 Drawing Sheets

(56) References Cited

U.S. PATENT DOCUMENTS

| | | | | |
|---|---|---|---|---|
| 5,144,222 | A * | 9/1992 | Herbert | H02J 9/061 |
| | | | | 323/271 |
| 5,191,519 | A * | 3/1993 | Kawakami | H02M 7/493 |
| | | | | 363/71 |
| 8,836,301 | B2 * | 9/2014 | Shono | H02M 3/1584 |
| | | | | 323/272 |
| 9,263,951 | B2 * | 2/2016 | Figge | H02M 3/337 |
| 9,331,499 | B2 * | 5/2016 | Ikriannikov | H02J 7/0014 |
| 9,356,519 | B2 * | 5/2016 | Kyono | H02M 3/285 |
| 9,729,063 | B2 * | 8/2017 | Kim | H02M 1/42 |
| 2004/0190314 | A1 * | 9/2004 | Yoshida | H02M 3/285 |
| | | | | 363/65 |
| 2009/0066262 | A1 * | 3/2009 | Tateishi | H02M 3/1584 |
| | | | | 315/291 |
| 2010/0013304 | A1 * | 1/2010 | Heineman | H02J 1/08 |
| | | | | 307/31 |
| 2010/0033154 | A1 * | 2/2010 | Cheng | H02M 3/1584 |
| | | | | 323/293 |
| 2010/0226149 | A1 * | 9/2010 | Masumoto | H02M 1/4225 |
| | | | | 363/20 |
| 2010/0320983 | A1 * | 12/2010 | Wu | H02M 3/1584 |
| | | | | 323/283 |
| 2011/0127976 | A1 * | 6/2011 | Hiltbrunner | H02M 3/3378 |
| | | | | 323/272 |
| 2011/0188273 | A1 * | 8/2011 | Pansier | H02M 3/1584 |
| | | | | 363/44 |
| 2011/0298433 | A1 * | 12/2011 | Tam | H02M 3/1588 |
| | | | | 323/282 |
| 2013/0038130 | A1 * | 2/2013 | Lai | H02J 3/381 |
| | | | | 307/80 |
| 2013/0147272 | A1 * | 6/2013 | Johnson | H02J 3/36 |
| | | | | 307/29 |
| 2013/0193755 | A1 * | 8/2013 | Chang | H02M 3/1584 |
| | | | | 307/18 |
| 2013/0313908 | A1 * | 11/2013 | Liu | H02J 4/00 |
| | | | | 307/72 |
| 2014/0160814 | A1 * | 6/2014 | Morimoto | H02M 3/1584 |
| | | | | 363/65 |
| 2014/0175888 | A1 * | 6/2014 | Deboy | H02J 3/381 |
| | | | | 307/82 |
| 2014/0203639 | A1 * | 7/2014 | Rozman | H02J 7/1423 |
| | | | | 307/28 |
| 2014/0268891 | A1 * | 9/2014 | Sigamani | H02M 3/285 |
| | | | | 363/17 |
| 2015/0002112 | A1 * | 1/2015 | Tang | H02H 7/1213 |
| | | | | 323/271 |
| 2015/0236595 | A1 * | 8/2015 | Babazadeh | H02M 3/1584 |
| | | | | 323/272 |
| 2015/0326021 | A1 * | 11/2015 | Cousineau | H02M 7/483 |
| | | | | 307/52 |
| 2015/0349634 | A1 * | 12/2015 | Tschirhart | H02M 3/156 |
| | | | | 323/271 |
| 2016/0033978 | A1 * | 2/2016 | Giuntini | H02M 7/493 |
| | | | | 307/31 |
| 2016/0315548 | A1 * | 10/2016 | Jasim | H02M 1/00 |
| 2017/0025961 | A1 * | 1/2017 | Seeman | H02M 1/08 |
| 2017/0264183 | A1 * | 9/2017 | Jasim | H02M 7/483 |
| 2017/0358929 | A1 * | 12/2017 | Koeppe | H02J 13/00028 |
| 2018/0175744 | A1 * | 6/2018 | Jasim | H02M 7/483 |
| 2018/0262112 | A1 * | 9/2018 | Saito | H02M 3/1584 |
| 2018/0301987 | A1 * | 10/2018 | Abe | H02M 1/088 |
| 2018/0323714 | A1 * | 11/2018 | Johnson | H02M 1/08 |
| 2019/0348837 | A1 * | 11/2019 | Iyasu | H02M 3/33507 |
| 2020/0044553 | A1 * | 2/2020 | Guo | G01R 31/42 |
| 2020/0068694 | A1 * | 2/2020 | Ishiyama | G01N 23/04 |

OTHER PUBLICATIONS

A. Olmos-Lopez et al., "Passivity-based control for currentsharing in PFC interleaved boost converters," Applied Power Electronics Conference and Exposition (APEC), 2011 Twenty-sixth Annual IEEE, Mar. 6, 2011, pp. 475-480.
Extended European Search Report dated Mar. 4, 2020.
Communication pursuant to Article 94(3) EPC dated Nov. 16, 2020 in European Patent Application No. 18 784 933.6.

* cited by examiner

TARGET CURRENT   TARGET VOLTAGE

Fig.9A Case1
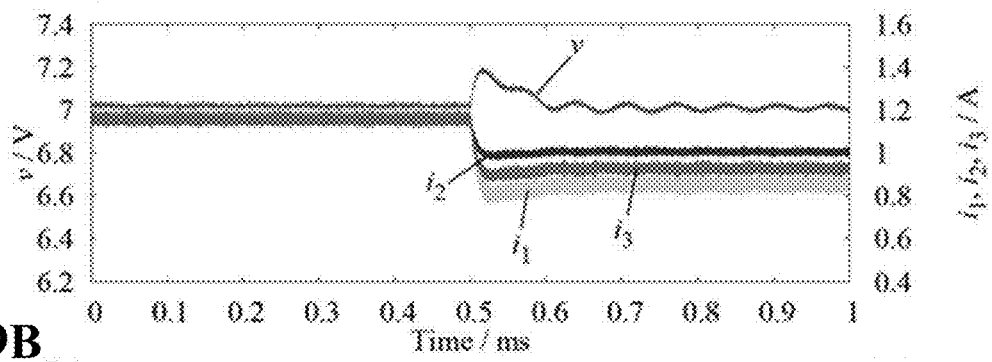
Fig.9B
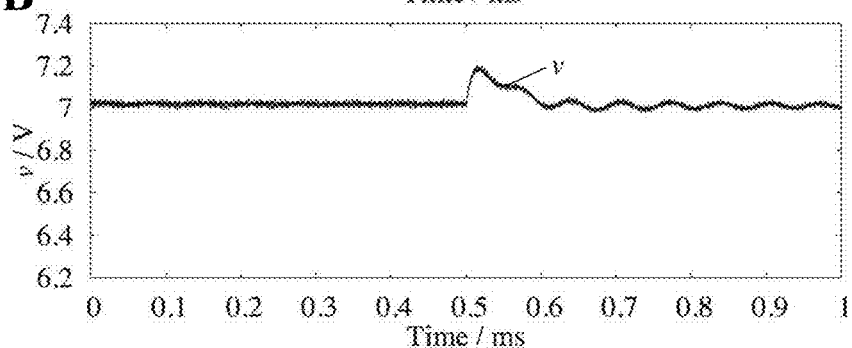
Fig.9C
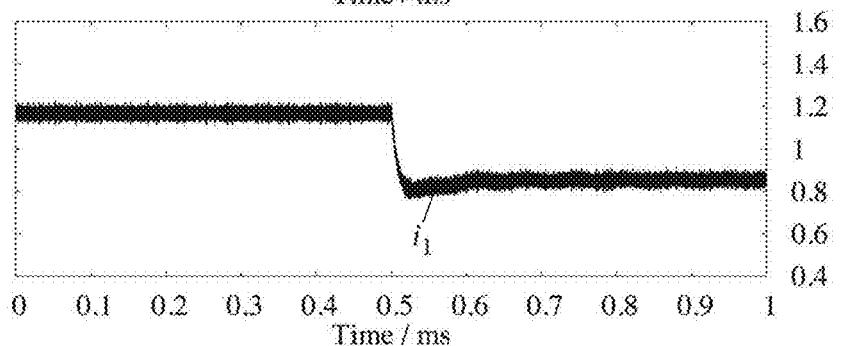
Fig.9D
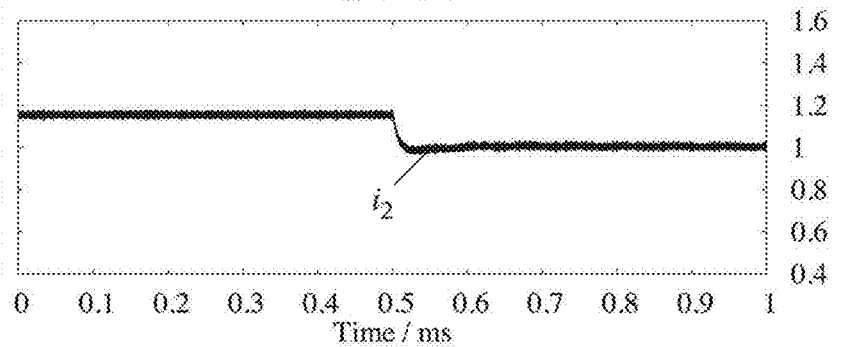
Fig.9E
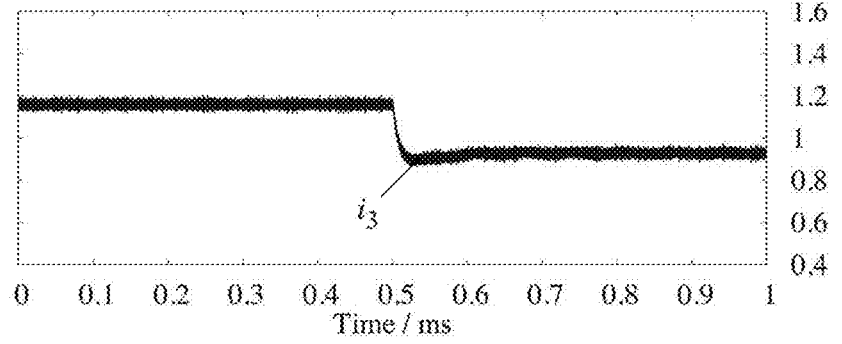

PASSIVITY-BASED SWITCHING POWER SUPPLY SYSTEM, CONTROLLER, AND CONTROL METHOD

TECHNICAL FIELD

The present invention relates to a switching power supply system, a controller, and a control method.

BACKGROUND ART

A switching power supply such as a DC-DC converter can be stabilized by applying passivity-based control to the switching power supply. Passivity is a concept focusing on energy. In a system having passivity, (energy supply rate to the system)≥(increasing rate of stored energy in the system) is satisfied. The energy inputted to the system that satisfies the passivity is stored in the system or dissipated. Passivity-based control is control focusing on passivity of a system, and the system can be stabilized by causing a control target to operate while satisfying passivity.

In Non-Patent Literature 1, numerical verification for stabilization in a parallel circuit of DC-DC converters is conducted by utilizing a feature that a system consisting of subsystems each satisfying passivity also satisfies passivity.

CITATION LIST

Non Patent Literature

NON PATENT LITERATURE 1: T. Hikihara and Y. Murakami, Regulation of Parallel Converters with Respect to Stored Energy and Passivity Characteristics, IEICE Transactions on Fundamentals of Electronics, Communications and Computer Sciences, 94 (3), 1010-1014 (2011).

SUMMARY OF INVENTION

Technical Problem

By applying passivity-based control to each of a plurality of converters connected in parallel, the parallel circuits as a whole are expected to satisfy passivity and be stabilizable.

However, in order to apply passivity-based control to each of a plurality of circuits connected in parallel, a function representing stored energy needs to be set. For this purpose, a target state needs to be set for each of the plurality of circuits connected in parallel. In this case, with increase in the number of the circuits connected in parallel, the number of the target states to be set increases, which may disadvantageously complicate the design of a controller.

Therefore, it is desired to use a simpler target state when passivity-based control is applied to each of the plurality of circuits connected in parallel.

Solution to Problem

In one embodiment, the above problem is solved by performing passivity-based control by use of a sum of currents that flow in the circuits connected in parallel.

BRIEF DESCRIPTION OF DRAWINGS

FIG. A is a circuit diagram of a switching power supply system.

FIG. 9A shows transient response waveforms of currents and a voltage in a parallel circuit of 3 buck converters in Case 1.

FIG. 9B shows a transient response waveform of an output voltage v.

FIG. 9C shows a transient response waveform of a current $i_1$.

FIG. 9D shows a transient response waveform of a current $i_2$.

FIG. 9E shows a transient response waveform of a current $i_3$.

DESCRIPTION OF EMBODIMENTS

Figure 1A:
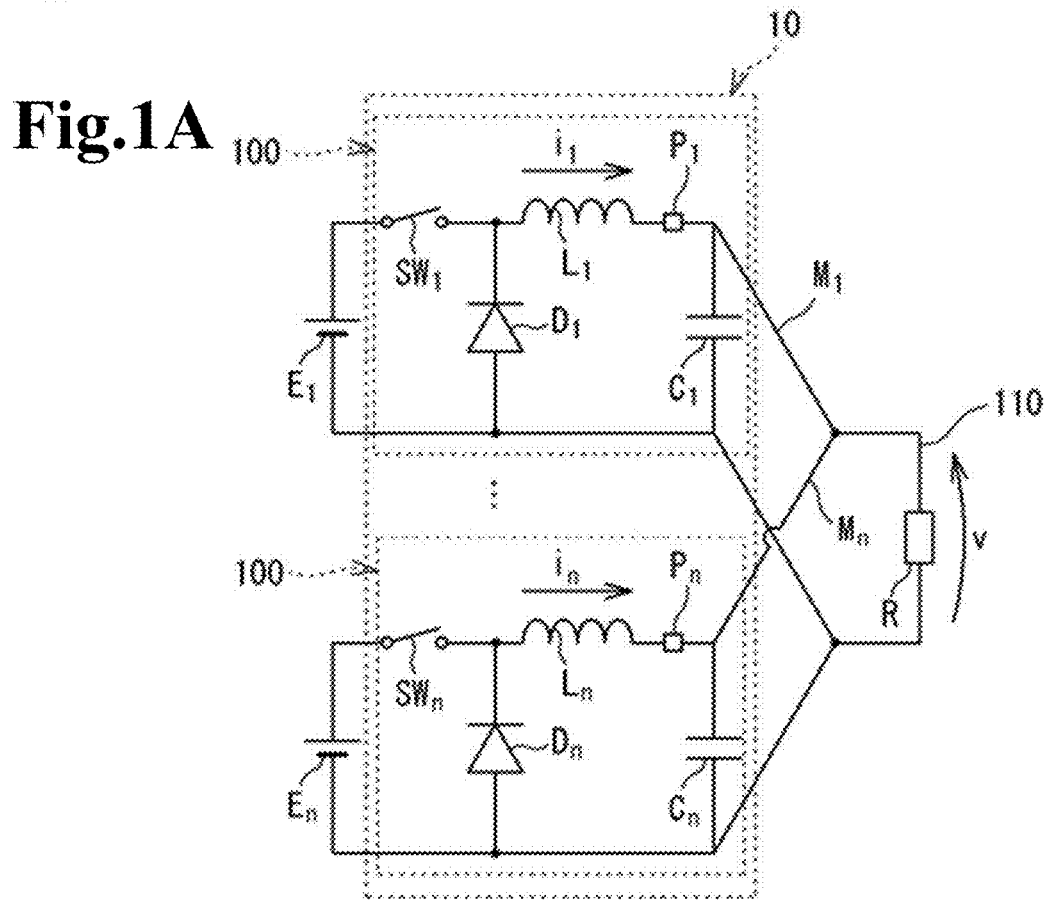
FIG. 1B is a block diagram of the switching power supply system.

1. Switching Power Supply System, Controller, and Control Method (1) A switching power supply system according to one embodiment includes a plurality of switching power supply circuits connected in parallel to a load. Each switching power supply circuit is a circuit whose output power is controlled by switching, and which is a DC-DC converter or an AC-DC converter, for example. The DC-DC converter is, for example, a buck converter, a boost converter, a buck-boost converter, or a Ćuk converter. All the plurality of switching power supply circuits may be of the same type, or different types of circuits may be included. The plurality of switching power supply circuits may share circuit elements.

The switching power supply system according to the embodiment includes a controller configured to switch each of the plurality of switching power supply circuits through passivity-based control. The controller performs the passivity-based control by using a sum of currents that flow in the plurality of switching power supply circuits. The control using the sum of the currents that flow in the plurality of switching power supply circuits allows reduction in the number of target states.

(2) The passivity is preferably a control rule in which a time-dependent change of a Hamiltonian of a deviation system is negative.

(3) The sum of the currents is preferably a sum of currents that flow in the same direction.

(4) The switching power supply system preferably includes a sensor configured to detect the sum of the currents in a line where the currents that flow in the plurality of switching power supply circuits merge. In this case, the number of sensors can be reduced.

(5) The switching power supply system may further include: a plurality of sensors configured to detect the currents that flow in the plurality of switching power supply circuits; and an adder. The sum of the currents may be calculated such that the values of the currents detected by the plurality of sensors are added by the adder. In this case, the sum of the currents that flow in the plurality of switching power supply circuits can be obtained by adding the currents detected by the plurality of sensors.

(6) The controller may include a plurality of sub-controllers that are provided so as to correspond to the respective switching power supply circuits. Each sub-controller can switch the corresponding switching power supply circuit, through passivity-based control in the corresponding switching power supply circuit, by using the sum of the currents.

(7) Each of the plurality of switching power supply circuits may be connected to the other ones of the plurality of switching power supply circuits so as to be able to absorb energy from the other switching power supply circuits. Since flow-in and flow-out of energy is allowed among the plurality of switching power supply circuits, it is not necessary to provide elements such as diodes for preventing flow of energy into the switching power supply circuits.

(8) Each of the plurality of switching power supply circuits may be a circuit that outputs a continuous current, such as a general DC-DC converter or AC-DC converter.

(9) Each of the plurality of switching power supply circuits may be a circuit that outputs a pulse current (discrete current). For example, each switching power supply circuit may be a circuit configured to generate a train of voltage pulses including address and control information. Each voltage pulse causes a pulse current, which sends power to the load, to flow. More specifically, the switching power supply circuit may be a power packet generation device disclosed in WO2014/077191 and WO2014/189051. The switching power supply circuit that outputs a pulse current is configured to have a switching element that performs switching of an output from a power supply, for example. The switching power supply circuit that outputs a pulse current has a smaller inductor component and a smaller capacitor component than a DC-DC converter in order to enable output of the pulse current. Even if an element that serves as an inductor or a capacitor is absent in the switching power supply circuit that outputs a pulse current, since lines in the circuit have an inductor component and a capacitor component, storage of energy occurs, and therefore, passivity-based control is applicable thereto.

(10) The plurality of switching power supply circuits may be connected to a plurality of different types of power supplies, respectively. Examples of types of power supplies include a primary battery, a secondary battery, a natural energy generator such as a solar battery, a commercial power supply, and a regenerative power supply. Regarding the plurality of different types of power supplies, at least one different type of power supply may be included among the plurality of power supplies. Not all of the plurality of power supplies need to be different in type.

(11) A controller according to one embodiment switches each of a plurality of switching power supply circuits connected in parallel to a load, through passivity-based control, by using a sum of currents that flow in the plurality of switching power supply circuits.

(12) A control method according to one embodiment is a control method for controlling a plurality of switching power supply circuits connected in parallel to a load. The method includes switching each of the plurality of switching power supply circuits, through passivity-based control, by using a sum of currents that flow in the plurality of switching power supply circuits.

2. Example of Switching Power Supply System

[2.1 Configuration of Switching Power Supply System]

FIG. 1A shows a switching power supply system 10 including a plurality of buck converters 100. The plurality of buck converters 100 are connected in parallel to a load R. In FIG. 1A, the number of the plurality of converters 100 is n (n: an integer not less than 2). Each of the plurality of converters 100 includes a switching element SW, a diode D, an inductor L, and a capacitor C. The switching element SW consists of a MOSFET, for example. Through ON/OFF control of the switching element SW, the magnitude of an output of the converter 100 can be determined. A power source E is connected to an input side of the converter 100. The power source E is a DC power source, for example. The load R is connected to an output side of the converter 100. A plurality of output lines M extending from the respective converters 100 are connected in parallel to a single line 110 that is connected to the load R. A sum of currents outputted from the output lines M of the respective converters 100 flows into the line 110.

Figure 1B:
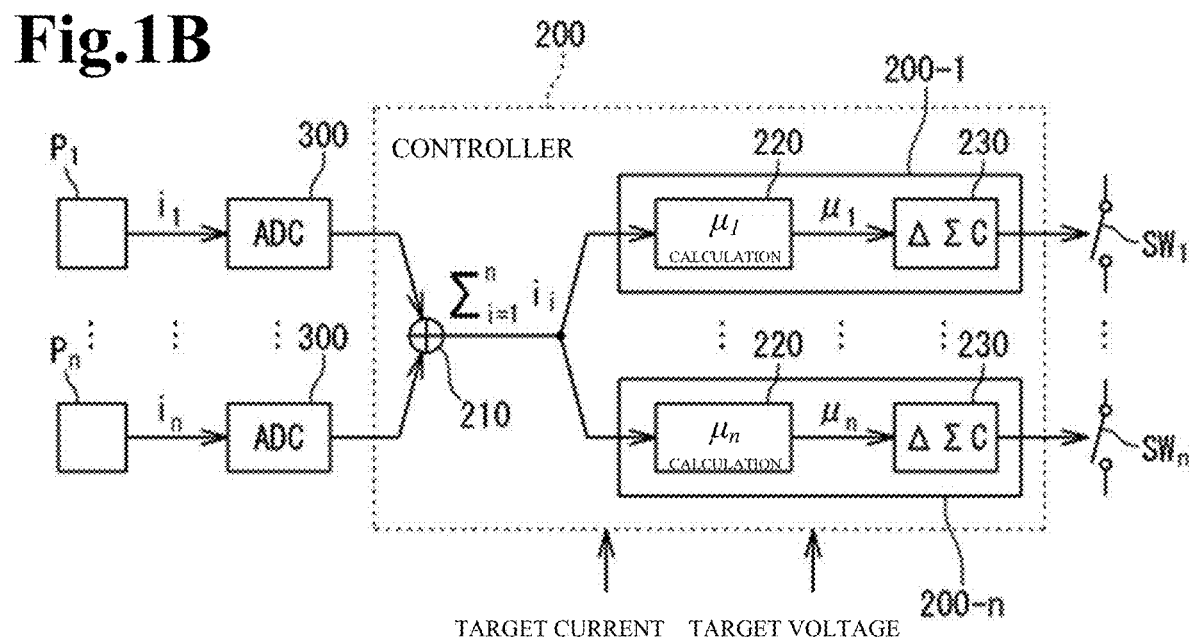

In FIG. 1A and FIG. 1B, in order to discriminate, among the respective converters 100, the elements SW, D, L, and C included in the converters 100, the currents i that flow in the converters 100, the power supplies E connected to the input sides of the converters 100, and the output lines M, subscripts "1" to "n" are appended to the characters representing them.

As shown in FIG. 1B, the switching power supply system 10 includes a controller 200. The controller 200 controls the plurality of converters 100. In this embodiment, the controller 200 includes a plurality of controllers 200-1 to 200-n provided so as to correspond to n converters 100, respectively. In the following description, the controllers 200-1 to 200-n are referred to as sub-controllers. Each of the sub-controllers 200-1 to 200-n controls switching of the switching element included in the corresponding converter 100 to be controlled. In this embodiment, the controller 200 controls switching of the switching element SW, with the current (inductor current in FIG. 1A) i that flows in the converter 100 being fed back.

The switching power supply system 10 shown in FIG. 1A includes a plurality of current sensors $P_1$ to $P_n$ for measuring currents $i_1$ to $i_n$ that flow in the inductors $L_1$ to $L_n$, respectively. The values of the currents $i_1$ to $i_n$ measured by the current sensors $P_1$ to $P_n$ are converted to digital signals by an AD converter 300, and the digital signals are provided to the controller 200.

The controller 200 shown in FIG. 1B includes an adder 210 for calculating the sum of the currents $i_1$ to $i_n$. Each of the sub-controllers 200-1 to 200-n includes a calculator 220 for calculating a control input μ according to a control rule, and a delta-sigma modulator 230. The respective calculators 220 calculate control inputs $\mu_1$ to $\mu_n$ to be input to the corresponding delta-sigma modulators 230, from the sum of the currents $i_1$ to $i_n$ that is outputted from the adder 210, on the basis of the control rule applied to the corresponding switching elements $SW_i$ to be controlled. The control rule will be described later.

Each delta-sigma modulator 230 generates, from the control input μ, a drive control signal for the switching element SW. The control input μ is a signal of continuous values, and takes values from 0 to 1, for example. The delta-sigma modulator 230 outputs, as a drive control signal, a pulse that represents the magnitude of the control input μ by pulse density. The drive control signal outputted from the delta-sigma modulator 230 is provided to a drive circuit (not shown), and the drive circuit turns ON and OFF the switching element SW in response to switching between high and low levels of the drive control signal.

The controller 200 is able to set a target voltage and a target current. The target voltage and the target current may be given from the outside of the controller 200, or may be determined by the controller 200. The target voltage is a target value of the voltage of the load R. In the present embodiment, the target current is a target value of the sum of the currents $i_1$ to $i_n$, which will be described later.

The respective sub-controllers 200-1 to 200n apply passivity-based control to the corresponding converters 100 to be controlled, thereby stabilizing the output currents and the output voltages to the load R from the plurality of converters 100 connected in parallel. Hereinafter, in order to facilitate understanding, passivity-based control and application of passivity-based control to a single buck converter will be described first, and thereafter, application of passivity-based control for the plurality of converters 100 connected in parallel will be described.

[2.2 Definition of Passivity]

[Math 1]

Assuming that an input to the system is $u \in \mathbb{R}^m$ and an output from the system is $y \in \mathbb{R}^m$, energy $W_{in}$ to be supplied to the system during a period from $t_0$ to t ($t_0 < t$) is defined as follows:

$$W_{in}(t_0, t) = \int_{t_0}^{t} u^T y \, d\tau$$

Assuming that the energy stored in the system at time t is $\mathcal{H}(t)$, the system that satisfies the following inequality is regarded to satisfy passivity.

$$\mathcal{H}(t) - \mathcal{H}(t_0) \leq W_{in}(t_0, t) \tag{1}$$

Passivity is a concept focusing on energy, and represents that the input energy is stored in the system or is dissipated.

[2.3 Passivity-Based Control]

Passivity is a concept based on energy. Therefore, by representing a target system (here, switching power supply system) focusing on energy, discussion on the passivity of the target system is facilitated. An example of representation of a system focusing on energy is a port-controlled Hamiltonian system (hereinafter referred to as PCH system).

The PCH system is expressed as follows:

[Math 2]

$$\begin{cases} \dfrac{dx}{dt} = (J - R)\dfrac{\partial \mathcal{H}}{\partial x} + g(x)u \\ y = g^T \dfrac{\partial \mathcal{H}}{\partial x} \end{cases} \tag{2}$$

Here, a state variable is $x \in \mathbb{R}^n$, a smooth unction (Hamiltonian) expressing stored energy is $\mathcal{H}$ ($\mathcal{H}: \mathbb{R}^n \to \mathbb{R}$, $\mathcal{H} > 0$), and variables expressing an input and an output to/from the system are u, $y \in \mathbb{R}^m$. In addition, $J (J \in \mathbb{R}^{n \times n})$ indicates a skew-symmetric matrix ($J = -J^T$), which expresses the structure of the system. $R (R \in \mathbb{R}^{n \times n})$ is a semi-definite symmetric matrix ($R = R^T > 0$), which expresses dissipation, and $g(x) \in \mathbb{R}^{n \times m}$ is an input matrix.

[Math 3]

$$\begin{aligned} \frac{d\mathcal{H}}{dt} &= -\left[\frac{\partial \mathcal{H}}{\partial x}\right]^T \frac{dx}{dt} \\ &= -\left[\frac{\partial \mathcal{H}}{\partial x}\right]^T \left\{(J - R)\frac{\partial \mathcal{H}}{\partial x} + g(x)u\right\} \\ &= -\left[\frac{\partial \mathcal{H}}{\partial x}\right]^T R \frac{\partial \mathcal{H}}{\partial x} + y^T u \left(\left[\frac{\partial \mathcal{H}}{\partial x}\right]^T J \frac{\partial \mathcal{H}}{\partial x} = 0\right) \end{aligned} \tag{3}$$

The time-derivative of the Hamiltonian H is calculated as follows:

The first term in the right side of expression (3) expresses energy to be dissipated while the second term in the right side expresses energy input to the system. From expression (3), in the PCH system, a change in the stored energy is a difference between the energy inputted to the system and the energy stored in the system. Therefore, the PCH system satisfies passivity.

It has been known that, in order to apply passivity-based control to a target system, representing the target system by a PCH system is effective. A converter can be represented by a PCH system. A system stabilization method according to passivity-based control is as follows.

[Math 4]

$$\begin{cases} \mathcal{H} > 0 & (x \neq x^*) \\ \mathcal{H} = 0 & (x = x^*) \end{cases} \quad (4)$$

When a control rule that satisfies $u^T y < 0$ in expression (3) is given, $d\mathcal{H}/dt < 0$ is satisfied, and the value of $\mathcal{H}$ comes closer to 0. If a function as follows can be selected as $\mathcal{H}$, the system can be asymptotically stabilized in terms of Lyapunov at a target state x'.

[2.4 Application of Passivity-Based Control to Single Buck Converter]

Figure 2:
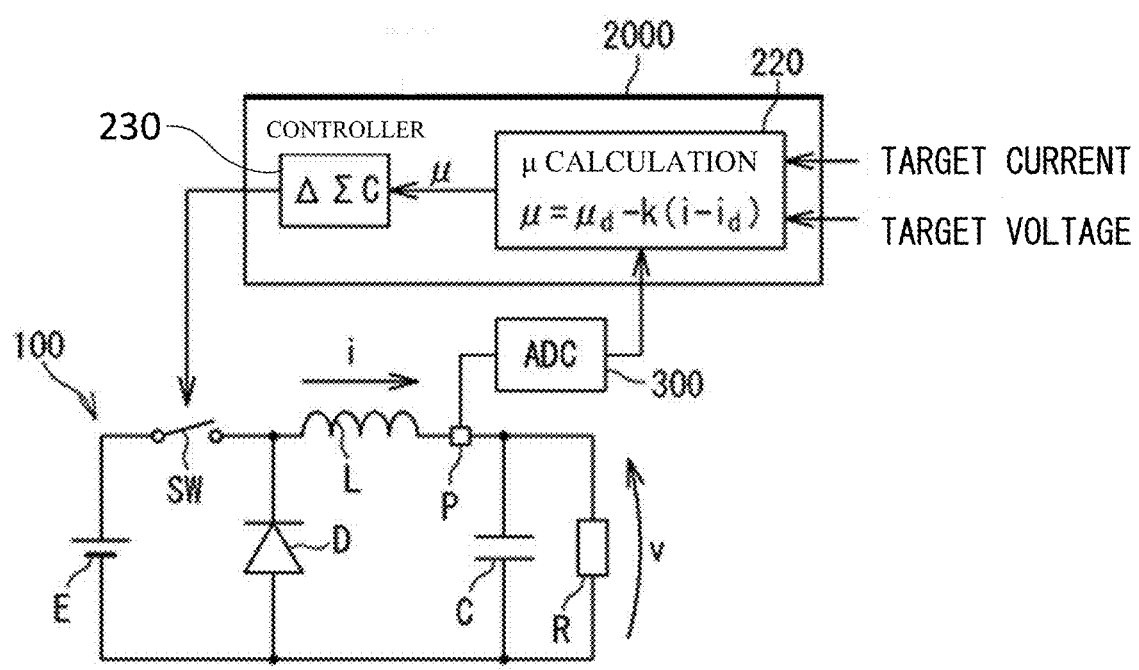
FIG. 2 is a circuit diagram of a switching power supply system of a single converter.

A single buck converter 100 shown in FIG. 2 has, as losses inside the circuit, conduction losses of the switching element (MOSFET) SW, the diode D, and the inductor L, for example. For example, the buck converter characteristics are expressed as follows by using a state-space averaging model, with the conduction losses being taken into account.

[Math 5]

$$\frac{d}{dt}\begin{bmatrix} \phi \\ q \end{bmatrix} = \begin{bmatrix} -R_{cond.}(\mu) & -1 \\ 1 & -1/R \end{bmatrix}\begin{bmatrix} i_L \\ v_R \end{bmatrix} + \begin{bmatrix} \mu E \\ 0 \end{bmatrix} \quad (5)$$

where $\phi$ is the magnetic flux of the inductor L, and q is the charge stored in the capacitor C. $R_{cond.}(\mu) = \mu R_m + (1-\mu)R_d + R_L$ is satisfied. $\mu$ is a control input to be inputted to the delta-sigma modulator 230. $R_m$ is the ON resistance of the switching element (MOSFET) SW, $R_d$ is the ON resistance of the diode D, and $R_L$ is the series resistance of the inductor L. R is the resistance of the load. $i_L$ is the current that flows in the inductor L and is measured by the current sensor P. v is the voltage of the load R. E is the power source voltage.

The single buck converter 100 shown in FIG. 2 is represented by a PCH system by using the model of expression (5). In FIG. 2 and the following expressions, the current that flows in the inductor L is indicated by i.

[Math 6]

$$\frac{dx}{dt} = \left\{\underbrace{\begin{bmatrix} 0 & -1 \\ 1 & 0 \end{bmatrix}}_{J} - \underbrace{\begin{bmatrix} R_{cond.}(\mu) & 0 \\ 0 & 1/R \end{bmatrix}}_{R}\right\}\frac{\partial \mathcal{H}}{\partial x} + \begin{bmatrix} E & 0 \\ 0 & 0 \end{bmatrix}u \quad (6)$$

When $\mathcal{H} = \frac{1}{2}(Li^2 + Cv^2)$, $x = [\phi, q]^T$, $u = [\mu, 0]^T$ is satisfied, expression (5) is expressed by the following PCH system (an expression relating to the output y is omitted).

Regarding the policy of deriving the control rule to be applied to the system of expression (6), the Hamiltonian $\mathcal{H}$ is regarded as a Lyapunov function, and control that allows the Lyapunov function to monotonously decrease is applied. For this purpose, it is necessary to obtain a PCH system having stored energy (Hamiltonian $\mathcal{H}_e$ of a deviation system) that becomes 0 at the target state $x_d = [Li_d, Cv_d]^T$.

Assuming that $\mathcal{H}_e = \frac{1}{2}\{L(i-i_d)^2 - C(v-v_d)^2\}$, $x_e = [L(i-i_d), C(v-v_d)]^T$, the following expression is obtained from expression (6).

[Math 7]

$$\frac{dx}{dt} = \begin{bmatrix} -R_{cond.}(\mu_d) & -1 \\ 1 & -1/R \end{bmatrix}\frac{d\mathcal{H}_e}{dx_e} + \begin{bmatrix} (\mu - \mu_d)\{E - (R_m - R_d)i\} \\ 0 \end{bmatrix} \quad (7)$$

[Math 8]

$$\frac{d\mathcal{H}_e}{dt} = \quad (8)$$

$$(\mu - \mu_d)\{E - (R_m - R_d)i\}(i - i_d) - R_{cond.}(\mu_d)(i - i_d)^2 - \frac{1}{R}(v - v_d)^2$$

The time-derivative of the Hamiltonian of the deviation system is represented as follows:

By giving a control rule that makes the first term of expression (8) negative, the time-dependent change of the Hamiltonian of the deviation system becomes negative, and the control system is asymptotically stabilized in terms of Lyapunov.

A control rule for feedback of the current (inductor current) i flowing in the inductor L in FIG. 2 is as follows:

[Math 9]

$$\mu = \mu_d - k(i - i_d) \quad (9)$$

where $\mu_d$ is a target value, of the control input $\mu$, which depends on the target voltage v of the load R. $i_d$ is a target value of the inductor current i. k is a control gain.

When the control rule of expression (9) is given, expression (8) is transformed into

[Math 10]

$$\frac{d\mathcal{H}_e}{dt} = -k\{E - (R_m - R_d)i\}(i - i_d)^2 - R_{cond.}(\mu_d)(i - i_d)^2 - \frac{1}{R}(v - v_d)^2 \quad (10)$$

and then if

[Math 11]

$$E - (R_m - R_d)i > 0 \quad (11)$$

is satisfied, the time-dependent change of the Hamiltonian of the deviation system becomes negative, and the control system is asymptotically stabilized in terms of Lyapunov.

[2.5 State Equation of Parallel Circuit of n Buck Converters]

Hereinafter, a parallel circuit of n buck converters 100 as shown in FIG. 1A is represented by using a PCH system. A state equation of the parallel circuit of n buck converters is represented by the following PCH system (expression relating to output y is omitted).

[Math 12]

$$\frac{dx}{dt} = (J - R)\frac{\partial \mathcal{H}}{\partial x} + g(x)u \quad (12)$$

$$= \begin{bmatrix} 0 & \begin{matrix} -1 \\ \vdots \\ -1 \end{matrix} \\ 1 \cdots 1 & -\frac{1}{R} \end{bmatrix}\begin{bmatrix} i_1 \\ \vdots \\ i_n \\ v \end{bmatrix} + \begin{bmatrix} \mu_1 E_1 \\ \vdots \\ \mu_n E_n \\ 0 \end{bmatrix}$$

Here, the power supply voltage of each converter is $E_i$, the inductor is $L_i$, the capacitor is $C_i$, the inductor current is $i_i$, and the output voltage is v. The state variable is $x = [L_i i_i, \ldots, L_n i_n; \Sigma_{i=1}^n C_i v]^T$, and the stored energy of the circuit is $\mathcal{H} = \frac{1}{2}(\Sigma_{i=1}^n L_i i_i^2 + \Sigma_{i=1}^n C_i v^2)$. High-frequency switching is assumed, and $\mu \in [0, 1]$ is satisfied.

Also in the parallel circuit of n buck converters 100, the same control rule as the control rule (expression (9)) given to the single buck converter 100 is applied to each individual buck converter 100 to perform passivity-based control, whereby the entire system can be stabilized. According to the feature that a system consisting of subsystems each satisfying passivity also satisfies passivity, when passivity-based control is applied to each individual converter 100 which is a subsystem, the entire switching power supply system 10 satisfies passivity, whereby the entire system consisting of the parallel circuit can be stabilized.

However, when setting of target states is performed on expression (12), since the state variable x is an n+1 dimensional vector, n+1 target states are needed. The larger the number of target states is, the stricter the constraint on setting of target states becomes, which may complicate the design of the controller 200.

In order to reduce the number of target states, a parallel circuit of n buck converters is represented by a PCH system having a low-dimensional state variable x'. Expression (12) is transformed to obtain the following state equation.

[Math 13]

$$\frac{d}{dt}\begin{bmatrix} L'\sum_{i=1}^n i_i \\ t\sum_{i=1}^n C_i v \end{bmatrix} = \begin{bmatrix} 0 & -1 \\ 1 & -\frac{1}{R} \end{bmatrix} \begin{bmatrix} \sum_{i=1}^n i_i \\ v \end{bmatrix} + \begin{bmatrix} \sum_{i=1}^n (L'/L_i)\mu_i E_i \\ 0 \end{bmatrix} \quad (13)$$

Expression (13) represents a PCH system when $x'=[L'(\Sigma_{i=1}^n i_i), \Sigma_{i=1}^n C_i v]^T$, $\mathcal{H}' = \frac{1}{2}\{L'(\Sigma_{i=1}^n i)^2 + \Sigma_{i=1}^n C_i v^2$, and $L'=1/(\Sigma_{i=1}^n 1/L_i)\}$ are satisfied.

According to expression (13), the sum $(i_1 + \ldots + i_n)$ of the inductor currents of the respective converters 100 and the output voltage v can be target values. That is, in expression (13), target values to be set are two values, i.e., a target current value and a target voltage value. The sum $(i_1 + \ldots + i_n)$ of the inductor currents is a current to be supplied to the load R in the stationary state.

According to expression (13), a desired current value that flows to the load may be set as a target current value, and it is not necessary to set a target current value to the current outputted from each individual buck converter 100.

[2.6 Control Rule for Stabilizing n Parallel Circuits]

Passivity-based control is applied to the PCH system of expression (13).

[Math 14]

$$\frac{dx_e}{dt} = \begin{bmatrix} 0 & -1 \\ 1 & -\frac{1}{R} \end{bmatrix} \frac{\partial \mathcal{H}_e}{\partial x_e} + \begin{bmatrix} \sum_{i=1}^n (L'/L_i)(\mu_i - \mu_{id})E_i \\ 0 \end{bmatrix} \quad (14)$$

With a target state being $x'_d = [L'I_d, \Sigma_{i=1}^n C_i v_d]^T$ ($I_d = v_d/R$), if the Hamiltonian of a deviation system is $\mathcal{H}'_e = L'(\Sigma_{i=1}^n i - I_d)^2 + \Sigma_{i=1}^n C(v-v_d)^2$ and a variable of the deviation system is $x'_e = x'-x'_d$, a deviation-based PCH system as follows can be created.

The time-dependent change of the Hamiltonian $\mathcal{H}'_e$ is calculated as follows:

[Math 15]

$$\frac{d\mathcal{H}'_e}{dt} = -\frac{1}{R}(v-v_d)^2 + \sum_{i=1}^n \left\{ \frac{L'}{L_i}(\mu_i - \mu_{id})\left(\sum_{i=1}^n i - I_d\right)E_i \right\} \quad (15)$$

By applying a control rule that makes the time-dependent change of the Hamiltonian $\mathcal{H}'_e$ negative, the system can be stabilized in the target state.

A control rule that makes the second term in the right side of expression (15) negative is expressed by the following expression (16), for example.

[Math 16]

$$\mu_i = \mu_{id} - k_i\left(\sum_{i=1}^n i - I_d\right) + \frac{L_i}{E_i}f_i\left(\sum_{i=1}^n f_i = 0\right) \quad (16)$$

where $\mu_i$ is the control rule for the i-th converter 100 (switch $SW_i$). $\mu_{id}$ is the target value, of $\mu_i$, which depends on the target voltage $v_d$ of the load R. $k_i$ is the control gain for the i-th converter 100. $I_d$ is a target output current value of the entire parallel circuit of n converters 10.

Each of the n calculators 220 for $\mu$ in the sub-controllers 200-1 to 200-n shown in FIG. 1B calculates a control input $\mu_i$ for controlling the corresponding switch $SW_i$ to be controlled, according to expression (16).

According to expression (16), in the control rule $\mu_i$ for controlling each individual converter 100, the target output current value $I_d$ for the entire parallel circuit of n converters 100 may be set, and it is not necessary to set a target current value for each converter 100. Moreover, since attention is focused on the entire parallel circuit, a term $f_i$, which does not appear in the control rule for the single converter 100, is introduced in the control rule of expression (16). Attention is focused on this term $f_i$ in numerical calculation described later.

Figure 3:
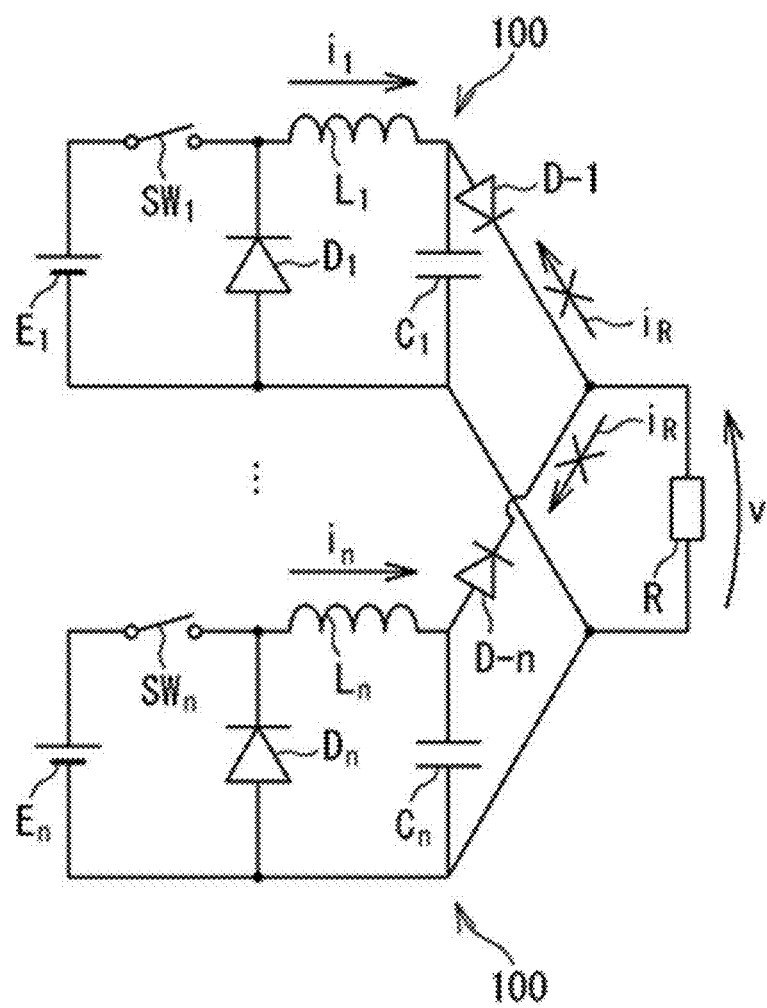
FIG. 3 is a circuit diagram of a switching power supply system having diodes.

When the plurality of converters 100 are connected in parallel to the load, diodes D-1 to D-n are generally provided at the outputs of the respective converters 100 as shown in FIG. 3 to prevent a current $i_R$ from a certain converter 100 from flowing into another converter. In contrast to this, in the circuit shown in FIG. 1, since each converter 100 is not affected by a current flowing from another converter 100, no diodes are provided to the output lines $M_1$ to $M_n$. That is, each converter 100 is connected to the other converter 100 so as to be able to absorb energy from the other converter 100. As a result, in the circuit shown in FIG. 1A, diodes can be dispensed with.

Figure 4A:
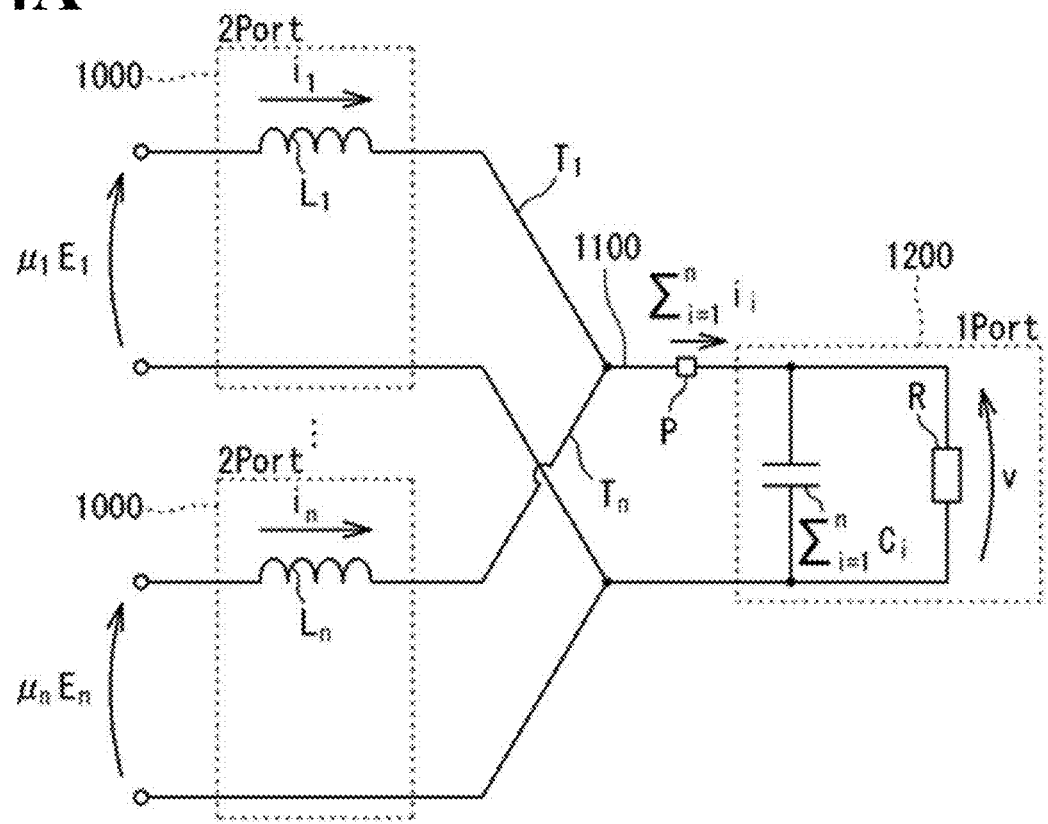
FIG. 4A is a circuit diagram of a switching power supply system.
Figure 5:
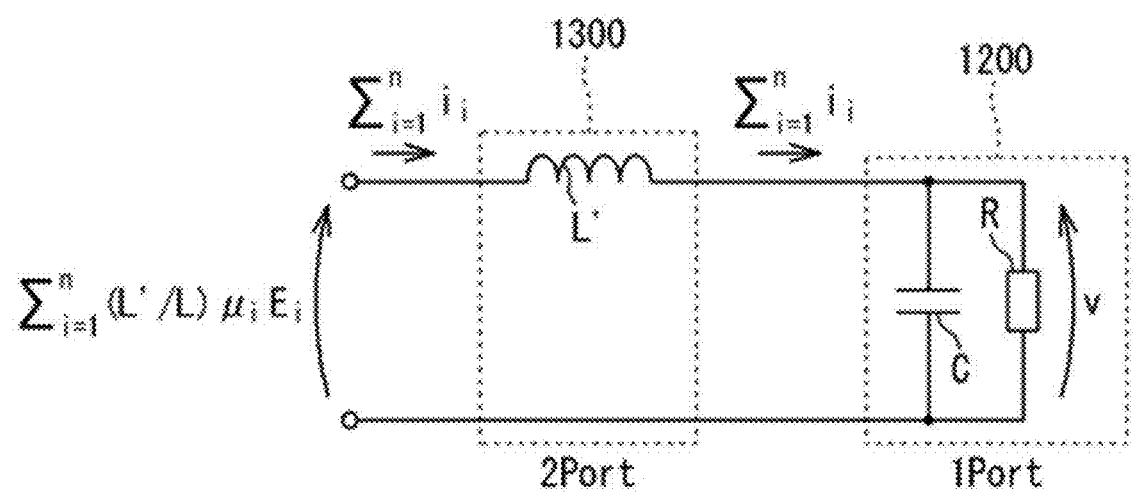
FIG. 5 shows an equivalent circuit of the switching power supply system.

The PCH system expressed by the aforementioned expression (12) is regarded as a system in which 2-port circuits 1000 as shown in FIG. 4A are connected in parallel to a circuit 1200 including a load R. Meanwhile, the PCH system expressed by expression (13) can be regarded as a system in which a parallel circuit of n buck converters 100 is regarded as a single 2-port circuit 1300 as shown in FIG. 5.

Figure 4B:
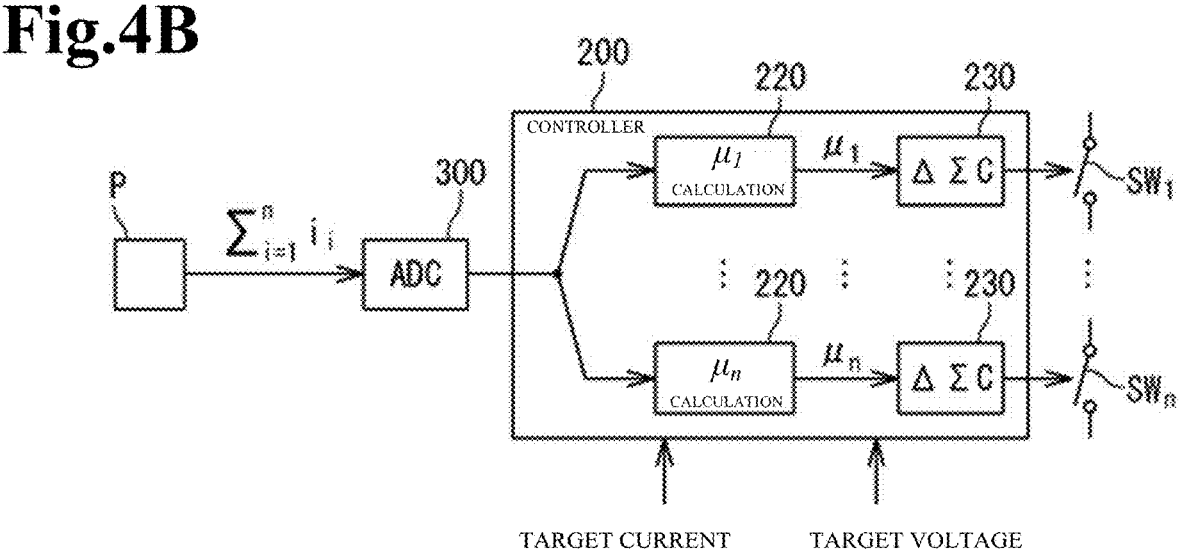
FIG. 4B is a block diagram of the switching power supply system.

In FIG. 1A and FIG. 1B, the sum $(i_1+ \ldots +i_n)$ of the inductor currents of the respective converters 100 is obtained such that the current values measured by the n current sensors $P_1$ to $P_n$ are added by the controller 200. Meanwhile, in FIG. 4A, a line 1100, in which lines $T_1$ to $T_n$ through which the inductor currents $i_1$ to $i_n$ flow are merged and reach the load R, is provided, whereby the sum $(i_1+ \ldots +i_n)$ of the inductor currents flows in the line 1100. A current sensor P for measuring the current that flows in the line 1100 is provided, whereby the sum $(i_1+ \ldots +i_n)$ of the inductor currents can be measured by the single current sensor P. Therefore, as shown in FIG. 4B, the number of the feedback elements to be given to the controller 200 can be reduced from n to 1. Moreover, the controller 200 need not have an adder 210 for calculating the sum $(i_1+ \ldots +i_n)$ of the currents. A single current sensor P may be provided to the line 110 in the circuit shown in FIG. 1A, and a sensor for measuring voltages of the capacitors $C_1$ to $C_n$ may be provided. Then, the controller 200 may calculate the sum $(i_1+ \ldots +i_n)$ of the inductor currents from the value of the current that flows in the line 110, based on the capacitor voltages and the differential values of the capacitor voltages.

[2.7 Numerical Calculation]

Figure 6:
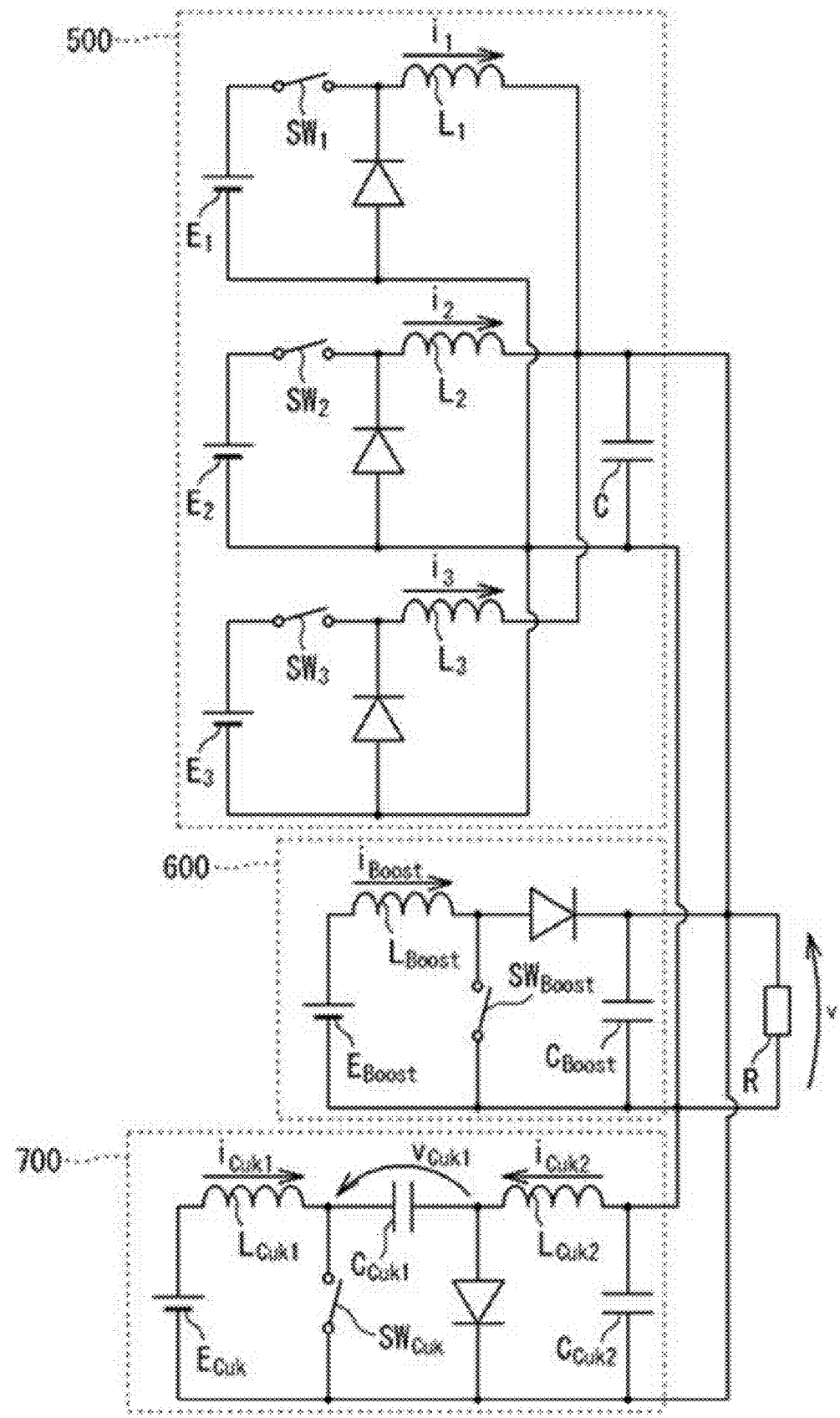
FIG. 6 is a circuit diagram of a switching power supply system used for numerical calculation.

In order to confirm the effect of the control rule expressed by expression (16), numerical calculation was performed on a parallel circuit shown in FIG. 6. In the circuit shown in FIG. 6, a parallel circuit 500 of 3 buck converters, one boost converter 600, and one Ćuk converter 700 are connected in parallel to a load R.

Parameters of the parallel circuit 500 of buck converters are as follows:

$L_1=22$ [μH], $L_2=47$ [μH], $L_3=30$ [μH], $C=26$ [μF], $E_1=E_2=E_3=30$ [V]

Parameters of the boost converter 600 are as follows:

$L_{Boost}=10$ [pH], $C_{Boost}=20$ [μF], $E_{Boost}=3$ [V]

Parameters of the Ćuk converter 700 are as follows:

$L_{Ćuk1}=L_{Ćuk2}=8$ [μH], $C_{Ćuk1}=8$ [μF], $C_{Ćuk2}=4$ [μF], $E_{Ćuk}=10$ [V]

These circuits 500, 600, and 700 are circuits used as low-voltage large-current power supplies, and the current capacity can be increased by parallelizing these circuits. Since the power supply circuits of the various circuit configurations are connected in parallel, the entire parallel system shown in FIG. 6 is a complicated system.

In the numerical calculation, the control rule of mathematical expression (16) is applied to each of the 3 buck converters in the parallel circuit 500, while control rules for stabilizing the single converters 600 and 700 through passivity-based control are applied to the boost converter 600 and the Ćuk converter 700. Since each of the boost converter 600 and the Ćuk converter 700 is a single converter, passivity can be understandably satisfied through the passivity-based control. The control rules $\mu_{Boost}$ and $\mu_{Ćuk}$ of the boost converter 600 and the Ćuk converter 700 are respectively represented by the following expressions.

[Math 17]

$$\mu_{Boost} = \mu_{Boostd} - k_{Boost}\{v_d(i_{Boost}-i_{Boostd}) - i_{Boostd}(v-v_d)\} \quad (17)$$

[Math 18]

$$\mu_{Ćuk} = \mu_{Ćukd} - k_{Ćuk}\{v_{Ćuk1}(i_{Ćuk1}-i_{Ćuk1d}) + (i_{Ćuk2d}-i_{Ćuk1d})(v_{Ćuk1}-v_{Ćuk1d}) + v_{Ćuk1d}(i_{Ćuk2}-i_{Ćuk2d})\} \quad (18)$$

where $i_{Boost}$ is the inductor current of the boost converter 600, $i_{Ćuk1}$ and $i_{Ćuk2}$ are the currents of the inductors $L_{Ćuk1}$ and $L_{Ćuk2}$ of the Ćuk converter 700, respectively, and $v_{Ćuk1}$ is the voltage of the capacitor $C_{Ćuk1}$ of the Ćuk converter 700. Regarding a target value of each variable, "d" is annexed to the subscript. $k_{Boost}$ and $k_{Ćuk}$ are control gains.

A transient response was measured with the load R being changed from 1 to 1.25Ω. Switching elements $SW_1$, $SW_2$, $SW_3$, $SW_{Boost}$, and $SW_{Ćuk}$ are driven through delta-sigma modulation at a sampling frequency of 10 MHz. The target voltage of the load R is 7 V. The sharing ratio of the load current is $x_{Ćuk}=x_{Boost}=\frac{1}{4}$ and $x_{Buck}=\frac{1}{2}$. The parallel circuit 500 of 3 buck converters is given only a target state that half the current amount required by the load R should be outputted from the entire parallel circuit 500. In the stationary state before the load change, the respective buck converters are controlled such that the inductor currents $i_1$, $i_2$, and $i_3$ thereof are equal to each other. Simultaneously with the load change, the control rule for the buck converters is switched to expression (16).

The numerical calculation was performed for two settings, i.e., Case 1 and Case 2. In Case 1, assuming that, in the respective circuits connected in parallel, the settings thereof were not mutually known, the control rule of expression (15) where $f_i=0$ was applied to each circuit. In Case 2, assuming that, in the first and third circuits among the 3 parallel circuits, the settings thereof were mutually known, $f_1=-f_3=-2.4\times10^{-4}$ (v-vd) and $f_2=0$ were applied. In both Case 1 and Case 2, the control gain was set at $k_i=0.05$.

Hereinafter, the transient response of the Hamiltonian of the deviation system obtained through the numerical calculation will be described. The Hamiltonian of the deviation system of the boost converter 600 is expressed as follows:

[Math 19]

$$\mathcal{H}_{booste} = \frac{1}{2}\{L_{boost}(i_{boost}-i_{boostd})^2 + C_{boost}(v-v_d)^2\} \quad (19)$$

The Hamiltonian of the deviation system of the Ćuk converter 700 is expressed as follows:

[Math 20]

$$\mathcal{H}_{Ćuke} = \frac{1}{2}\{\Sigma_{n=1}^2 L_{Ćukn}(i_{Ćukn}-i_{Ćuknd})^2 + C_{Ćuk1}(v_{Ćuk1}-v_{Ćuk1d})^2 + C_{Ćuk2}(v-v_d)^2\} \quad (20)$$

The Hamiltonian of the deviation system of the parallel circuit 500 of buck converters is expressed as follows:

[Math 21]

$$\mathcal{H}_{Bucke} = \frac{1}{2}\{L'(\Sigma_{i=1}^n i)^2 + Cv^2, L'=1/(\Sigma_{i=1}^n 1/L_i)\} \quad (21)$$

The Hamiltonian of the deviation system of the entire parallel circuit shown in FIG. 6 is the sum of expressions (19) to (21).

Figure 7A:
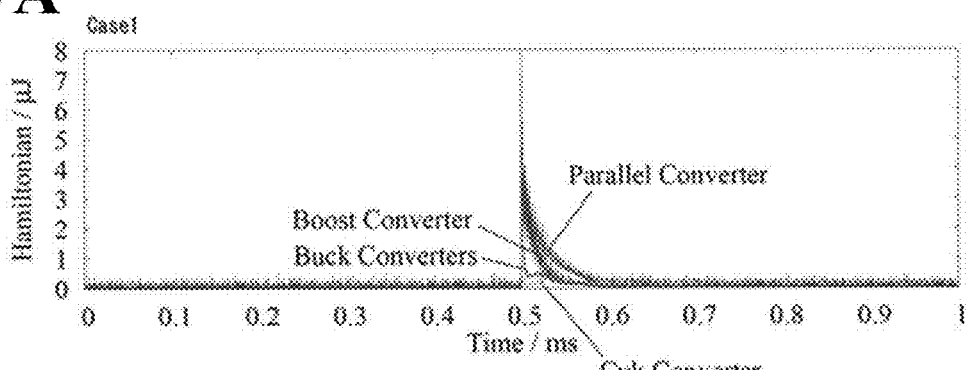
FIG. 7A shows a transient response waveform of a Hamiltonian of a deviation system in Case 1.
Figure 7B:
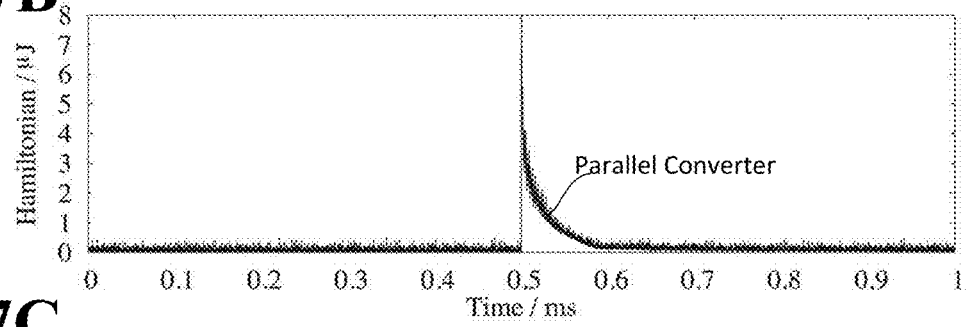
FIG. 7B shows a transient response waveform of a Hamiltonian of a deviation system of the entire parallel circuit shown in FIG. 6.
Figure 7C:
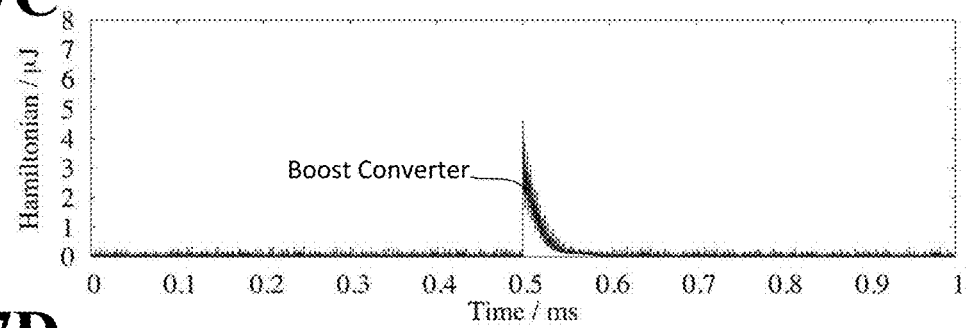
FIG. 7C shows a transient response waveform of a Hamiltonian of a deviation system of a boost converter.
Figure 7D:
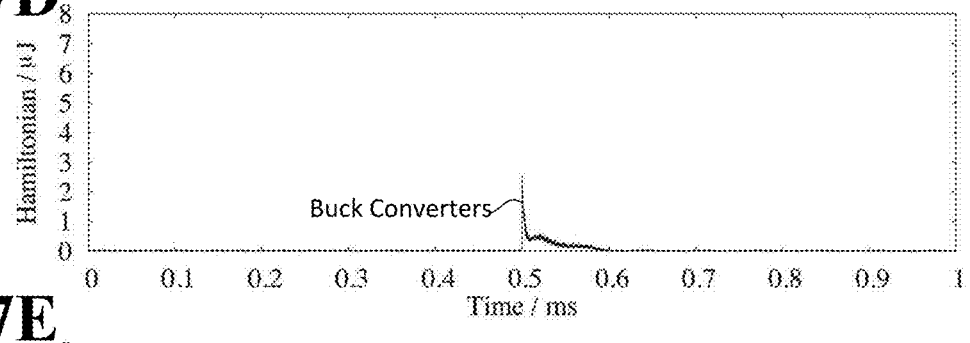
FIG. 7D shows a transient response waveform of a Hamiltonian of a deviation system of a buck converter.
Figure 7E:
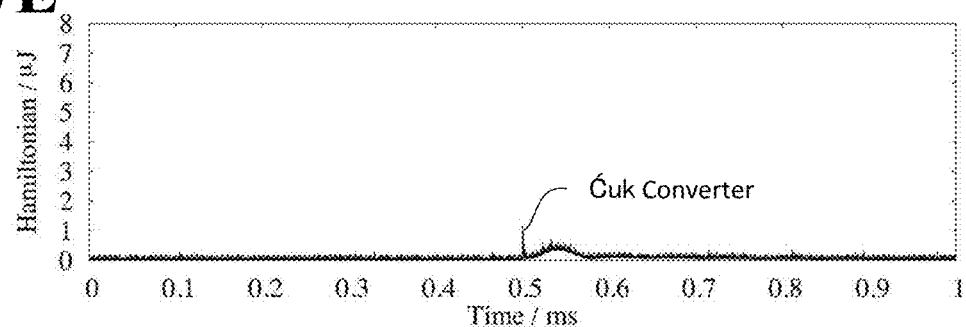
FIG. 7E shows a transient response waveform of a Hamiltonian of a deviation system of a Ćuk converter.
Figure 8A:
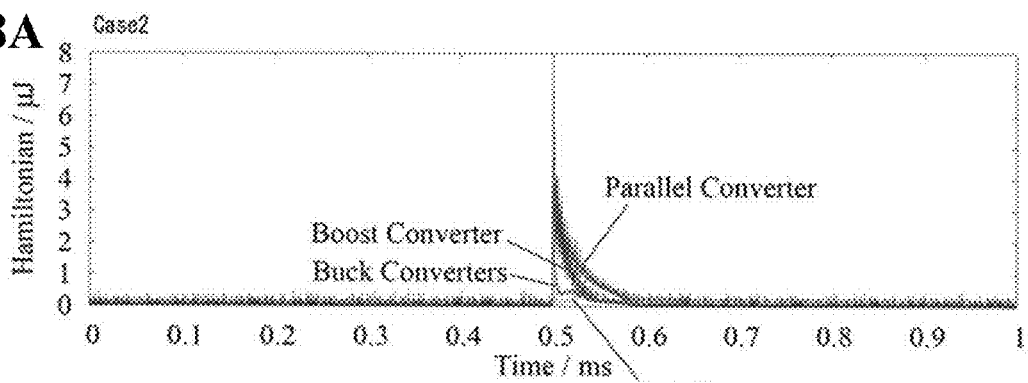
FIG. 8A shows a transient response waveform of a Hamiltonian of a deviation system in Case 2.
Figure 8B:
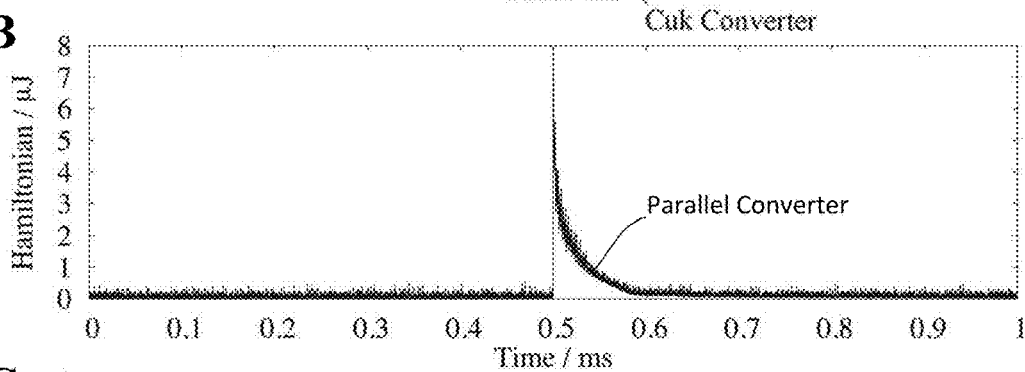
FIG. 8B shows a transient response waveform of a Hamiltonian of a deviation system of the entire parallel circuit shown in FIG. 6.
Figure 8C:
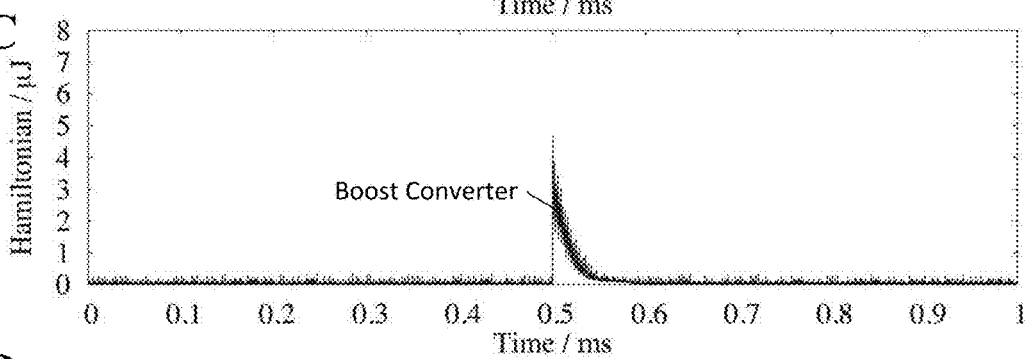
FIG. 8C shows a transient response waveform of a Hamiltonian of a deviation system of a boost converter.

FIG. 7A and FIG. 8A each show the result of the numerical calculation of the Hamiltonian of the deviation system. In FIG. 7A and FIG. 8A, "Parallel Converter" indicates the Hamiltonian of the deviation system of the entire parallel circuit shown in FIG. 6. FIG. 7B, FIG. 7C, FIG. 7D, and FIG. 7E individually show the Hamiltonians of the deviation systems of the respective converters shown in FIG. 7A. FIG. 8B, FIG. 8C, FIG. 8D, and FIG. 8E individually show the Hamiltonians of the deviation systems of the respective converters shown in FIG. 8A. In both Case 1 shown in FIG. 7A and Case 2 shown in FIG. 8A, the Hamiltonian of the deviation system of the entire parallel circuit shown in FIG. 6 gradually decreases and converges to 0, which indicates that the entire parallel circuit satisfies passivity (refer to FIG. 7B and FIG. 8B). Since each of the boost converter 600 and the Ćuk converter 770 is subjected to control to satisfy passivity by itself, the entire parallel circuit shown in FIG.

6 satisfies passivity, and therefore, it is understood that the parallel circuit 500 of 3 buck converters also satisfies passivity.

Figure 8D:
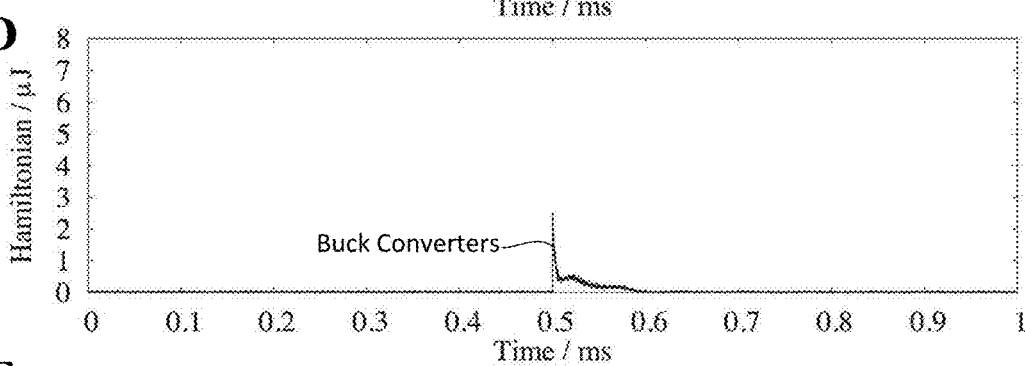
FIG. 8D shows a transient response waveform of a Hamiltonian of a deviation system of a buck converter.
Figure 8E:
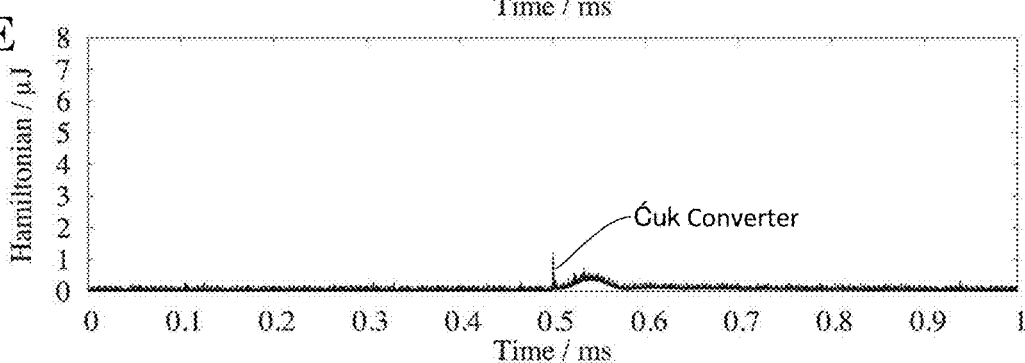
FIG. 8E shows a transient response waveform of a Hamiltonian of a deviation system of a Ćuk converter.

As shown in FIG. 7D and FIG. 8D, the Hamiltonian of the deviation system of the parallel circuit 500 of buck converters increases in the transient response. This is because the Hamiltonian, of the deviation system of the parallel circuit 500 of buck converters, which is obtained through the numerical calculation, does not accurately represent the energy of the parallel circuit 500 of buck converters. Regarding the function representing the stored energy of each of the converters 500, 600, and 700 in the parallel circuit shown in FIG. 6, influence of coupling of the capacitors C, $C_{Boost}$, and $C_{\acute{C}uk2}$ connected in parallel to the load R is not reflected in the function. Therefore, the Hamiltonian, of the deviation system of the parallel circuit 500 of buck converters, which is obtained through the numerical calculation, does not accurately represent the energy of the parallel circuit 500 of buck converters. Therefore, although the Hamiltonian of the deviation system of the parallel circuit 500 of buck converters increases in the transient response in terms of the numerical calculation, since the entire parallel circuit shown in FIG. 6 satisfies passivity, the parallel circuit 500 of 3 buck converters also satisfies passivity.

Figure 10A:
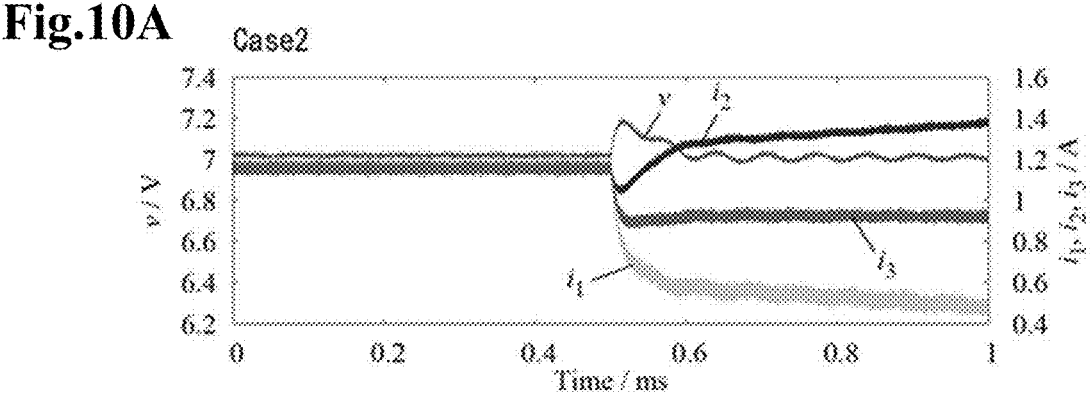
FIG. 10A shows transient response waveforms of currents and an output voltage in the parallel circuit of 3 buck converters in Case 2.
Figure 10B:
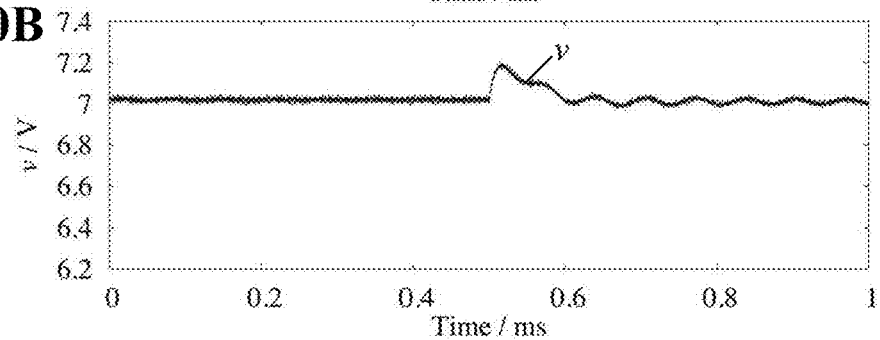
FIG. 10B shows a transient response waveform of an output voltage v.
Figure 10C:
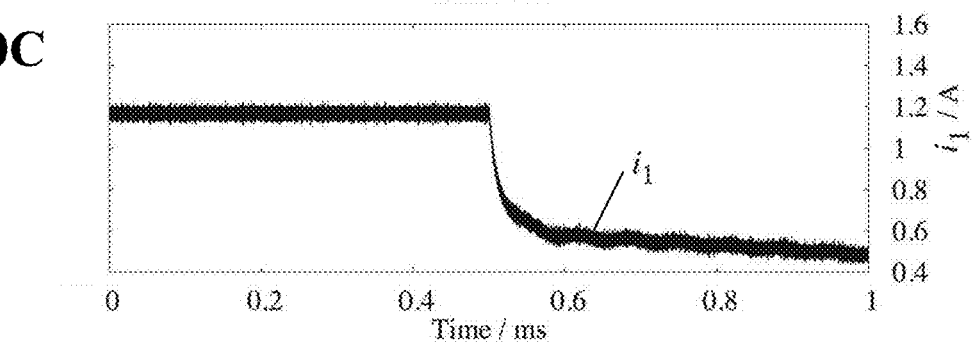
FIG. 10C shows a transient response waveform of a current $i_1$.
Figure 10D:
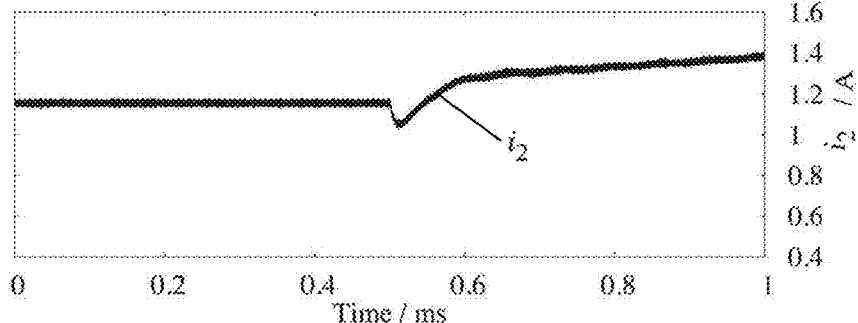
FIG. 10D shows a transient response waveform of a current $i_2$.
Figure 10E:
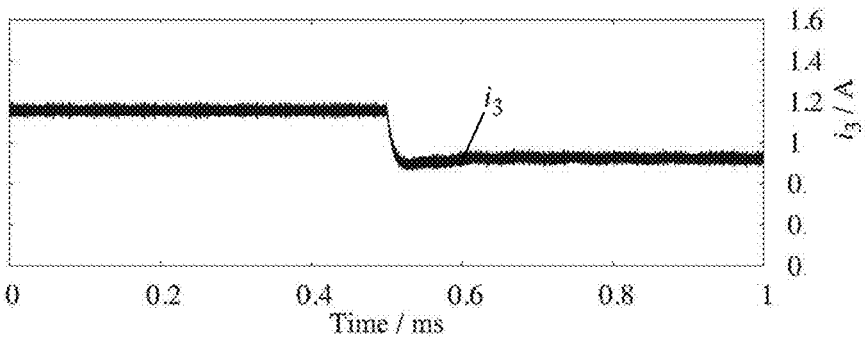
FIG. 10E shows a transient response waveform of a current $i_3$.

FIG. 9A and FIG. 10A each show transient response waveforms of currents $i_1$, $i_2$, and $i_3$ and a voltage v of the respective buck converters in the parallel circuit 500 of 3 buck converters shown in FIG. 6. FIG. 9B, FIG. 9C, FIG. 9D, and FIG. 9E individually show the voltage v and the currents $i_1$, $i_2$, and $i_3$ shown in FIG. 9A. FIG. 10B, FIG. 10C, FIG. 10D, and FIG. 10E individually show the voltage v and the currents $i_1$, $i_2$, and $i_3$ shown in FIG. 10A. Since different control rules are applied to the respective buck converters, the transient responses of the inductor currents $i_1$, $i_2$, and $i_3$ of the respective buck converters are different from each other. In both Case 1 shown in FIG. 9A and Case 2 shown in FIG. 10A, the output voltage v converges to the target value (also refer to FIG. 9B and FIG. 10B), and therefore it is understood that the parallel circuit 500 of 3 buck converters can be stabilized without setting target current values for the respective converters in the parallel circuit 500.

Figure 11A:
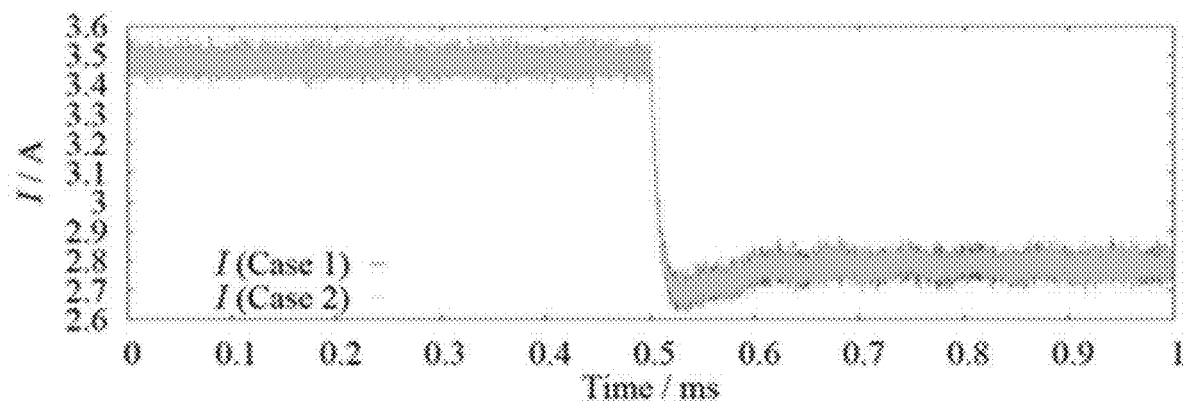
FIG. 11A shows transient response waveforms of sums of currents in the parallel circuit of 3 buck converters in Case 1 and Case 2.
Figure 11B:
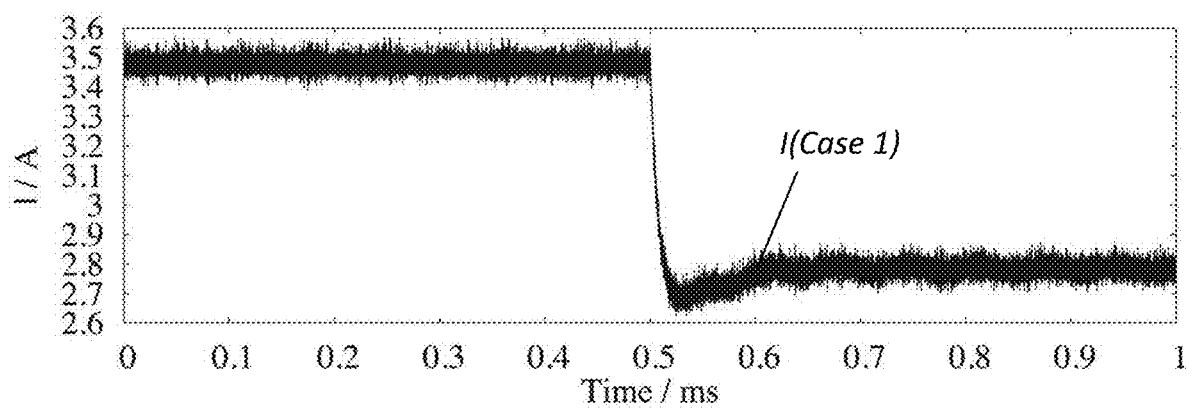
FIG. 11B shows the transient response waveform of the sum of currents in the parallel circuit of 3 buck converters in Case 1.
Figure 11C:
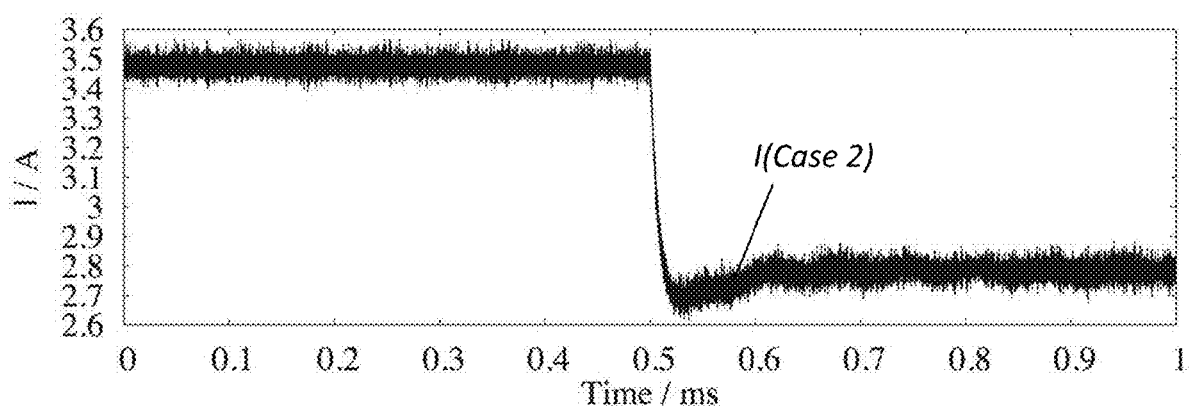
FIG. 11C shows the transient response waveform of the sum of currents in the parallel circuit of 3 buck converters in Case 2.
Figure 12A:
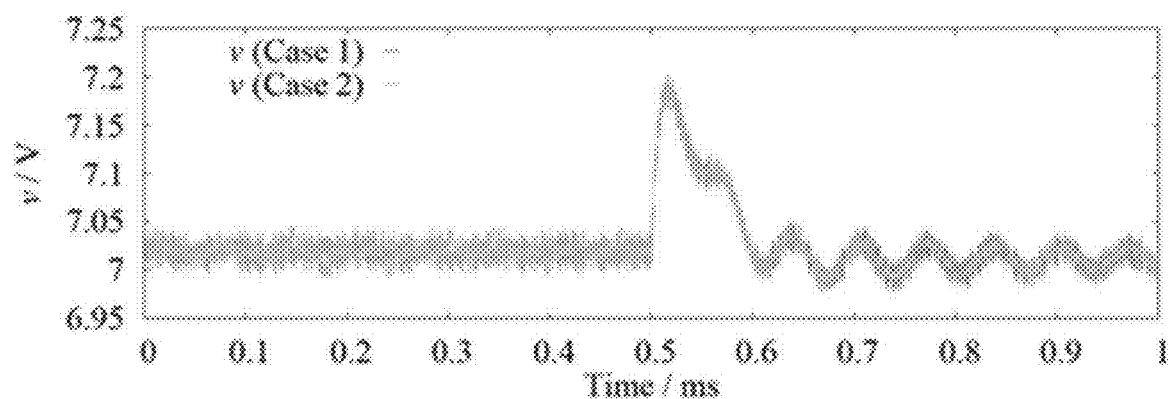
FIG. 12A shows transient response waveforms of output voltages in the parallel circuit of 3 buck converters in Case 1 and Case 2.
Figure 12B:
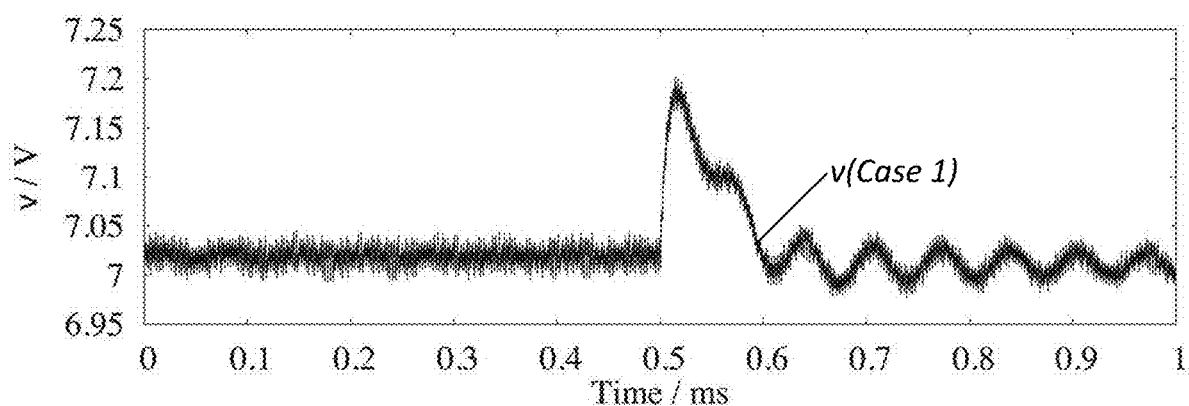
FIG. 12B shows the transient response waveform of the output voltage in the parallel circuit of 3 buck converters in Case 1.
Figure 12C:
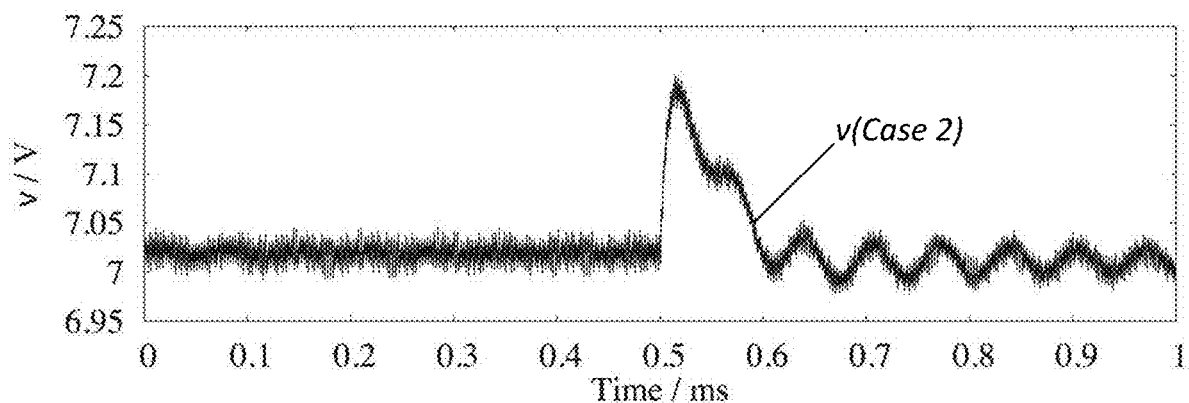
FIG. 12C shows the transient response waveform of the output voltage in the parallel circuit of 3 buck converters in Case 2.

FIG. 11A shows the transient response waveform of the sum ($i_1+i_2+i_3$) of the inductor currents of the respective buck converters in the parallel circuit 500 of 3 buck converters, and FIG. 12A shows the transient response waveform of the output voltage v. In FIG. 11A, Case 1 shown in FIG. 11B and Case 2 shown in FIG. 11C are overlapped with each other. In FIG. 12A, Case 1 shown in FIG. 12B and Case 2 shown in FIG. 12C are overlapped with each other. It is found from FIG. 11A and FIG. 12A that the transient response waveforms of Case 1 and Case 2 almost coincide with each other. This indicates that the influence of f given to the control rule in Case 2 remains within the parallel circuit 50 of 3 buck converters. Therefore, between Case 1 and Case 2, the transient response waveforms of the Hamiltonians of the deviation systems also coincide with each other.

3. Application Example

According to the present embodiment, a plurality of switching power supply circuits connected in parallel can be stabilized. The switching power supply system according to the present embodiment is effective in the situation where parallelization of power supplies is desired. The power supply parallelizing technique is used in various fields. The switching power supply system according to the present embodiment is effective for connecting, for example, various types of power supply circuits in parallel. In particular, the switching power supply system is effective for parallelization of a plurality of power supplies in a closed system. Since supply of energy is limited in the closed system, it is desired to appropriately parallelize a plurality of compact power supplies to ensure desired energy.

Parallelization of a plurality of power supplies in a closed system may be performed in, for example, a factory for producing a large variety of products in small quantities. In such a factory, the sizes (number of motors, power consumption) of industrial robots to be operated may vary depending on products to be produced. For example, usually, a plurality of small robots having less motors are operated. When a large robot having many motors is operated, a plurality of power supplies for the small robots are parallelized.

Regarding power supplies for information communication, parallelization of power supplies is performed in order to ensure a current capacity of several hundreds of amperes. Parallelization of the power supplies can increase redundancy as a power supply.

In recent years, parallelization of power supplies is also performed in motorized transport equipment. For example, in a large-sized airplane, generators mounted on both wings are connected in parallel. Meanwhile, in a small-sized airplane, a system in which a solar panel and a storage battery are connected in parallel may be used.

Furthermore, a system capable of MTTP control, in which a converter is connected to a predetermined number of cells of a solar panel to cope with variation in illuminance on the panel, is also used.

4. Modification

The present invention is not limited to the embodiment described above, and various modifications are possible.

REFERENCE SIGNS LIST

10 switching power supply system
100 buck converter
200 controller
210 adder
220 μ calculator
230 delta-sigma modulator
300 AC converter
1100 line
SW switching element
P current sensor
R load

The invention claimed is:
1. A switching power supply system comprising:
a plurality of switching power supply circuits connected in parallel to a load, wherein each switching power supply circuit of the plurality of switching power supply circuits includes a connection to a corresponding power supply of a plurality of power supplies;
a plurality of sensors configured to detect currents that flow in the plurality of switching power supply circuits; and
a controller configured to switch each of the plurality of switching power supply circuits, through passivity-based control, by using a sum of currents that flow in the plurality of switching power supply circuits, the controller including:

an adder that calculates the sum of the currents that flow in the plurality of switching power supply circuits based on values of the currents detected by the plurality of sensors; and a plurality of sub-controllers, each sub-controller corresponding to a switching power supply circuit of the plurality of switching power supply circuits, wherein each sub-controller generates a drive control signal for the corresponding switching power supply circuit based on a control rule to perform passivity-based control, the control rule based on the sum of currents that flow in the plurality of switching power supply circuit calculated by the adder and a target output current value of the plurality of switching power supply circuits, wherein each of the plurality of switching power supply circuits is stabilized by using the control rule, wherein each sub-controller includes:

a calculator that calculates a control input based on the control rule; and a modulator that generates the drive control signal for the corresponding switching power supply circuit based on the control input calculated by the calculator.

2. The switching power supply system according to claim 1, wherein the passivity-based control is control on the basis of the control rule in which a Hamiltonian of a deviation system decreases with time.

3. The switching power supply system according to claim 1, wherein the sum of the currents is a sum of currents that flow in the same direction.

4. The switching power supply system according to claim 1, further comprising a single current sensor configured to detect the sum of the currents in a line where the currents that flow in the plurality of switching power supply circuits merge.

5. The switching power supply system according to claim 1, wherein
each of the plurality of switching power supply circuits is connected to the other ones of the plurality of switching power supply circuits so as to be able to absorb energy from the other ones of the plurality of the switching power supply circuits.

6. The switching power supply system according to claim 1, wherein each of the plurality of switching power supply circuits outputs a continuous current.

7. The switching power supply system according to claim 1, wherein each of the plurality of switching power supply circuits outputs a pulse current.

8. The switching power supply system according to claim 1, wherein the plurality of switching power supply circuits are connected to the corresponding power supply of the plurality of power supplies, and wherein the plurality of power supplies is a plurality of different types of power supplies.

9. A controller configured to switch each of a plurality of switching power supply circuits connected in parallel to a load, through passivity-based control, by using a sum of currents that flow in the plurality of switching power supply circuits, the controller including:

an adder that calculates the sum of the currents that flow in the plurality of switching power supply circuits based on values of the currents detected by a plurality of sensors, the plurality of sensors configured to detect currents that flow in the plurality of switching power supply circuits; and a plurality of sub-controllers, each sub-controller corresponding to a switching power supply circuit of the plurality of switching power supply circuits, wherein each sub-controller generates a drive control signal for the corresponding switching power supply circuit based on a control rule to perform passivity-based control, the control rule based on the sum of currents that flow in the plurality of switching power supply circuit calculated by the adder and a target output current value of the plurality of switching power supply circuits, wherein each of the plurality of switching power supply circuits is stabilized by using the control rule, wherein each sub-controller includes:

a calculator that calculates a control input based on the control rule; and a modulator that generates the drive control signal for the corresponding switching power supply circuit based on the control input calculated by the calculator, and wherein each switching power supply circuit of the plurality of switching power supply circuits includes a connection to a corresponding power supply of a plurality of power supplies.

10. A control method for controlling a plurality of switching power supply circuits connected in parallel to a load, comprising:

detecting, by a plurality of sensors, currents that flow in the plurality of switching power supply circuits;

calculating, by an adder, a sum of the currents that flow in the plurality of switching power supply circuits based on values of the currents detected by the plurality of sensors;

generating, by each of a plurality of sub-controllers, a drive control signal for a corresponding switching power supply circuit of the plurality of switching power supply circuits based on a control rule to perform passivity-based control, the control rule based on the sum of currents that flow in the plurality of switching power supply circuit calculated by the adder and a target output current value of the plurality of switching power supply circuits, wherein each of the plurality of switching power supply circuits is stabilized by using the control rule, wherein each sub-controller corresponds to a switching power supply circuit of the plurality of switching power supply circuits, wherein each sub-controller includes a calculator and a modulator, and wherein generating the drive control signal includes:

calculating, by the calculator, a control input based on the control rule; and generating, by the modulator, the drive control signal for the corresponding switching power supply circuit based on the control input calculated by the calculator; and switching each of the plurality of switching power supply circuits, through the passivity-based control, by using the corresponding drive control signal of the respective sub-controller of the plurality of sub-controllers, wherein each switching power supply circuit of the plurality of switching power supply circuits includes a connection to a corresponding power supply of a plurality of power supplies.

* * * * *